Nov. 30, 1954 — G. MOUNTJOY ET AL — 2,695,997
RADIO NAVIGATION SYSTEM
Filed Jan. 1, 1945 — 5 Sheets-Sheet 1

Fig. 2.

United States Patent Office 2,695,997
Patented Nov. 30, 1954

2,695,997

RADIO NAVIGATION SYSTEM

Garrard Mountjoy, Manhasset, and Earl Schoenfeld, Mamaroneck, N. Y., and George D. Hulst, Jr., Upper Montclair, N. J., assignors to Radio Corporation of America, a corporation of Delaware Application January 1, 1945, Serial No. 570,818

11 Claims. (Cl. 343—103)

Our invention relates to radio navigation systems and particularly to systems of the type utilizing the time difference in the propagation of radio pulses from synchronized ground stations.

Navigation systems of this type employ pairs of synchronized ground stations that transmit radio pulses having at the instant of radiation a fixed time relation to each other. Each pair of ground stations preferably transmits pulses at its individual assigned repetition rate for the purpose of station selection. The pulses are radiated to receiving equipment located on the aircraft or ship whose position is to be determined. By means of the receiving equipment, the operator on the craft determines the time difference between the pulses from the two transmitter stations of one pair as they arrive at the receiver. Since the radio pulses travel from the ground transmitters to the receiver at a known propagation rate (i. e., at the velocity of light), it is known that the position of the craft is at some point on a line corresponding to the time difference reading. By obtaining the time difference reading from a second pair of ground stations, a second line corresponding to the second time difference reading is obtained, and the intersect point of the two lines is the position of the craft. Special maps having "time difference" lines printed thereon for the several pairs of ground stations are provided for use with the navigation system.

In order to measure the time difference in the arrival of successive pulses from a pair of ground stations, timing marker pulses that have a known time interval between them are generated. Also, pulses having a definite time relation to the time marker pulses are generated for the purpose of driving or synchronizing cathode ray deflecting circuits. These deflecting circuits produce cathode ray sweep traces on which the marker pulses and/or the received ground station pulses appear.

For the purpose of selecting a particular pair of ground stations, the operator selects a particular pulse repetition rate for the driving or synchronizing pulses corresponding to the repetition period of the pulses transmitted from said pair whereby the deflecting circuits may be synchronized with the received pulses from the selected pair of ground stations. Thus a particular pair of ground stations is selected at the receiver apparatus by turning a station selection switch to the position indicated on the receiver panel for obtaining sweep synchronizing pulses having the same repetition period as that of the pulses being transmitted from the selected pair of ground stations. Now the received pulses from the selected pair of ground stations can be made to appear stationary on the cathode-ray sweep or trace whereas those received from the other pairs of ground stations will move rapidly along the same trace.

In operation, the pulses from the two transmitter stations of a selected pair of stations (which pulses will be referred to as A and B pulses, respectively) are made to appear on two cathode-ray traces. The B pulse is identified as the pulse that occurs after or follows the midpoint of the other pulse period. The A and B pulses are brought into alignment or coincidence by moving the A pulse along its cathode-ray sweep trace, this being done by adjusting the starting time of the cathode-ray sweep. It is then possible to measure the time displacement of the sweep required for pulse alignment. This is done in one embodiment of the present system by blanking out the portion of the adjustable trace from the center of the deflecting wave cycle and by counting the timing markers appearing on the remaining portion of the trace. Thus, the desired time difference between pulses is determined. A precise determination of the time difference is made possible by so designing the system that the start of the unblanked portion of the trace is expanded.

An object of the present invention is to provide an improved method of and means for determining the time difference between electrical pulses.

A further object of the invention is to provide improved receiving equipment for a radio navigation system of the type utilizing the propagation of radio pulses from pairs of synchronized ground stations.

A still further object of the invention is to provide an improved method of and means for indicating the time difference between radio pulses transmitted from synchronized ground stations.

A still further object of the invention is to provide an improved method of and means for obtaining a simple time marker presentation in a radio navigation system of the above-mentioned type.

The invention will be better understood from the following description taken in connection with the accompanying drawing in which.

In the several figures, similar parts are indicated by similar reference characters.

The pulse generator and station selection circuit which will now be described under the headings "The pulse generator unit" and "Count subtraction for station selection" is the same as that described and claimed in application Serial No. 552,146, filed August 31, 1944, in the name of Earl Schoenfeld and entitled Timing marker and station selection apparatus.

*The pulse generator*

Figures 1, 1A:
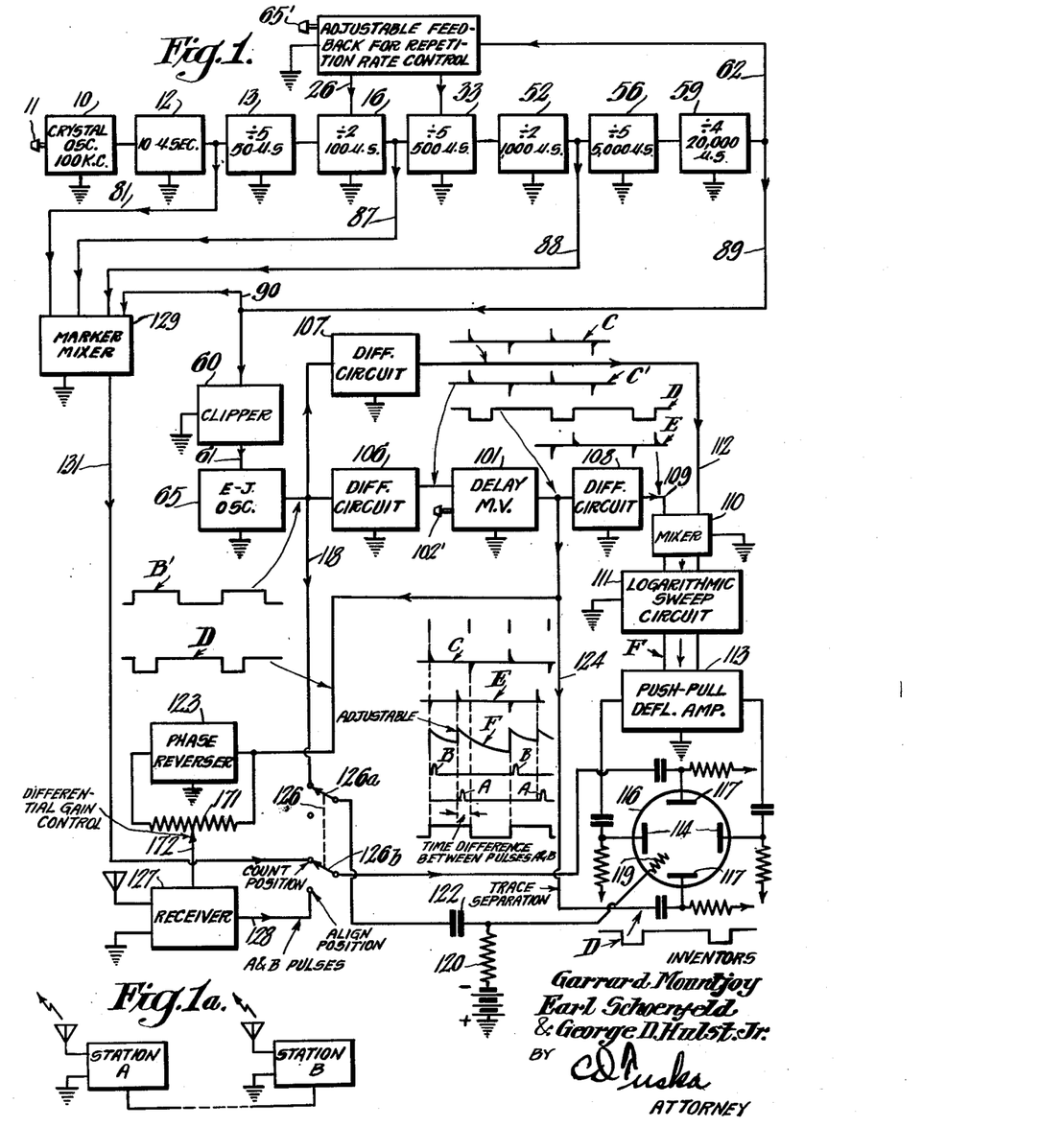
Figure 1 is a block diagram of navigation receiving apparatus designed in accordance with one embodiment of the invention.
Figure 1a is a block diagram representing one pair of ground radio transmitter stations of the navigation system which transmit A and B pulses, respectively.
Figure 2:
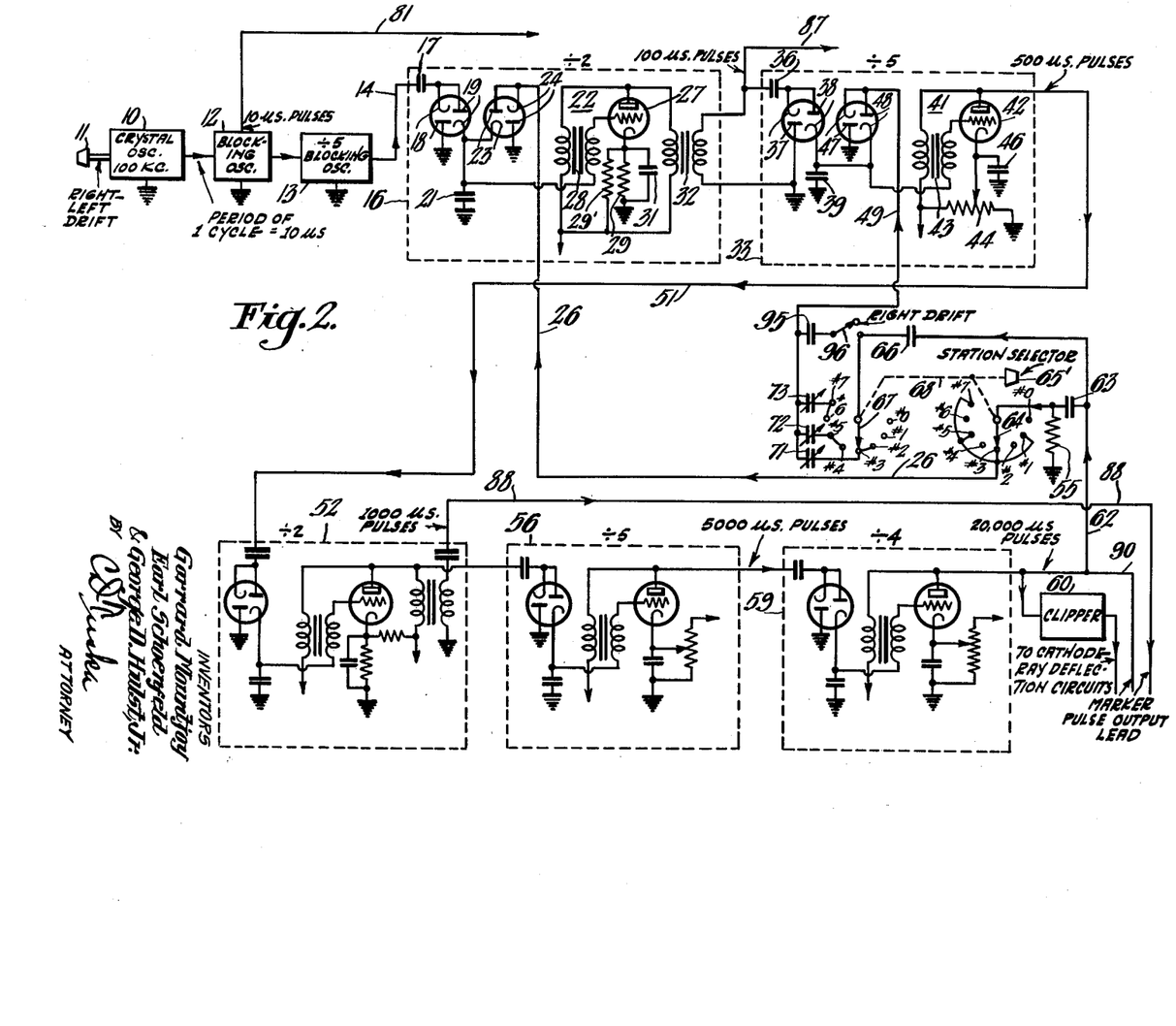
Figure 2 is a block and circuit diagram of the pulse generating unit shown in Fig. 1.

In Fig. 1, the pulse generating circuit for producing the timing marker pulses and for producing the controlling or synchronizing pulses that control the cathode-ray deflection is shown in block diagram at the top of the figure. It is shown in detail in Fig. 2. Referring to Figs. 1 and 2, the pulse generator comprises a crystal oscillator 10 that produces a sine wave voltage of stable frequency which in the example illustrated is 100 kilocycles per second, the repetition period being 10 microseconds. The frequency of the crystal oscillator output may be increased or decreased slightly by a manual adjustment as indicated at the control knob 11 for obtaining a "fine" right or left drift of a received pulse on a cathode-ray sweep trace, the rate of drift being slow enough to be useful on fast sweep presentation.

The crystal oscillator 10 drives a blocking oscillator 12 or the like to produce periodic pulses which, in the present example, also recur at the rate of 100 kc. per second. The repetition period or time interval between successive pulses is, therefore, 10 micro-seconds.

The frequency of the 10 μs. pulses is divided by five by means of a suitable frequency divider 13 such as a second blocking oscillator to produce 50 μs. pulses. While specific values are being given for the several frequency division steps, the invention is not limited to these particular values.

The 50 μs. pulses are applied through a lead 14 to a frequency divider 16 of the counter type described in White Patent 2,113,011. It divides the frequency by two to produce 100 μs. pulses. Also, an additional circuit is provided so that the divider 16 may be made to lose a "count" for the purpose of obtaining a different selected pulse repetition period.

The divider 16 comprises a counter circuit portion including an input or "bucket" capacitor 17, a pair of diodes 18 and 19, a "storage" capacitor 21 and a blocking oscillator portion 22. In addition, it includes a pair of diodes 23 and 24 associated with the storage capacitor 21 for the purpose of making the divider 16 lose a count upon the application of a pulse from a conductor 26 as will be explained hereinafter. The blocking oscillator 22 comprises a vacuum tube 27 and a transformer 28 coupling the plate circuit to the grid circuit. The cathode circuit includes a biasing resistor 29, bypassed by a capacitor 31, and connected in series with a bleeder resistor 29'. A transformer 32 supplies the 100 μs. pulses from the divider 16 to a frequency divider 33 which also is of the type which may be made to lose a "count."

The frequency divider 16 operates as follows: Each of the 50 μs. pulses of positive polarity from the lead 14 puts a predetermined charge on the comparatively large capacity storage capacitor 21 as a result of a pulse of current through the comparatively small "bucket" capacitor 17 and through the diode 19, the capacity of the capacitor 17 being small enough so that capacitor 17 receives full charge before the termination of an applied pulse. At the end of this current pulse, the capacitor 17 is discharged to ground potential through the diode 18. The next 50 μs. pulse puts an additional current pulse into capacitor 21, thus raising the voltage across capacitor 21 sufficiently to trigger the blocking oscillator 22 whereby a pulse is produced across the transformer 28 as is well understood in the art. The pulse thus produced is applied to the divider 33 with positive polarity. At the same time the blocking oscillator 22 discharges the capacitor 21 to bring it back to ground potential.

The frequency divider 33 divides the frequency by five to produce 500 μs. pulses. It includes a counter portion comprising a "bucket" capacitor 36, a pair of diodes 37 and 38, and a storage capacitor 39. It also includes a blocking oscillator portion 41 comprising a vacuum tube 42, a feedback transformer 43, a biasing resistor 44 and a bypass capacitor 46.

As in the preceding divider 16, there is provided in the divider 33 a pair of diodes 47 and 48 for subtracting counts. In the divider 33, however, the application of a pulse from a conductor 49 will subtract one, two or three counts depending upon the position of the station selection switch.

The 500 μs. pulses are supplied over a conductor 51 to a frequency divider 52 that divides by two to produce 1000 μs. pulses. The divider 52 is similar to the divider 16 with the count subtracting diodes omitted.

The 1000 μs. pulses are supplied to a frequency divider 56 that divides by five to produce 5000 μs. pulses which, in turn, are supplied to a frequency divider 59 that divides by four to produce 20,000 μs. pulses. The dividers 56 and 59 are similar to the divider 52 except for the difference in circuit constants.

The 20,000 μs. pulses may be passed through a clipping circuit 60 and supplied over a conductor 61 to a square wave generator 65 (Fig. 1), such as an Eccles-Jordan oscillator for obtaining a square wave having a repetition period of 40,000 μs. From this square wave are obtained, by means of suitable wave shaping and delay circuits described hereinafter, the desired driving or synchronizing pulses for the horizontal deflection.

The 20,000 μs. pulses are also supplied over a conductor 62 and through a "bucket" capacitor 63 of the first count subtraction circuit to a station selection switch 64; they are also supplied to the second count subtraction circuit through a coupling or blocking capacitor 66 of large capacity to a second station selection switch 67 which is ganged with the switch 64 as indicated by the broken line 68, the two switches being operated by a knob 65'.

At the switch 64, alternate switch contact points are connected to the feedback conductor 26 whereby at these switch point positions the 20,000 μs. pulses are fed back to the divider 16 to subtract counts. It may be desirable because of distributed or stray leakage in the switch 64 or capacitors 63 to connect its switch arm to ground through a 1 megohm resistor 55 to permit charges to leak off.

At the switch 67, the last six contact points are connected in pairs, the three pairs of contact points No. 2—No. 3, No. 4—No. 5 and No. 6—No. 7 being connected through "bucket" capacitors 71, 72 and 73, respectively, to the feedback conductor 49 which leads to the second count subtraction circuit. Thus, with switch 67 in any one of the last six positions, 20,000 μs. pulses are applied to the divider 33 to subtract counts.

Before discussing in detail the operation of the count subtracting circuits for station selection, it may be noted that the desired timing marker pulses are obtained at various points along the frequency divider circuit. In the present system, the 10 μs. pulses are supplied from the blocking oscillator 12 to an output lead 81. The 100 μs. pulses are supplied to an output lead 87. The 1000 μs. pulses and 20,000 μs. pulses are supplied to marker output leads 88 and 90. The marker leads 81, 87, 88 and 90 supply the 10 μs. pulses, the 100 μs. pulses, the 1000 μs. pulses and the 20,000 μs. pulses to a mixer tube or circuit 129 (Fig. 1) and from the mixer 129 to a vertical deflecting plate of a cathode ray tube 116 as described hereinafter. The cathode ray of the tube 116 is deflected horizontally by a deflecting wave that is in synchronism with the 40,000 μs. square wave from the Eccles-Jordan oscillator 65 (Fig. 1). It is evident that the 40,000 μs. horizontal deflection cycle has a fixed time relation to the timing marker pulses. As will be apparent from the following description, the 20,000 μs. pulses may be omitted from the group of marker pulses supplied to the marker mixer 129, if desired, where the feature of blanking out a portion of the adjustable trace is employed.

*Count subtraction for station selection*

Referring now more particularly to the feature of subtracting counts for the purpose of station selection, specific pulse repetition rates for a plurality of pairs of ground transmitter stations will be referred to by way of example to aid in explaining the operation.

It will be assumed that the first pair of ground stations transmit the A pulses with a repetition period of 40,000 μs. and transmit the B pulses with a like repetition period; that the second pair of ground stations transmit A and B pulses having a repetition period of 39,900 μs.; that the third pair transmits 39,800 μs. pulses; that the fourth pair transmits 39,700 μs. pulses, etc. It is apparent that for station selection at the receiving apparatus, the operator must be able to select corresponding repetition periods for the output of the square wave generator 65 which controls the cathode ray deflection cycle; namely, periods of 40,000 μs.; 39,900 μs.; 39,800 μs.; 39,700 μs.; 39,600 μs.; etc.

It will be noted that the several repetition periods differ from each other by 100 μs. or by integral multiples thereof, and that this corresponds to repetition period differences of 50 μs. or integral multiples thereof at the output of the frequency divider chain, i. e., at the input of the clipper 60. Therefore, the desired repetition period can be obtained by shortening the 20,000 μs. period by 50 μs., by 100 μs., by 150 μs., etc.

For example, to obtain the 39,900 μs. repetition period the switches 64 and 67 are moved to the No. 1 switch contact points. At this switch position the 20,000 μs. pulses from the lead 62 are fed back by way of the "bucket" capacitor 63, the switch 64 and the conductor 26 to the frequency divider 16 only. Upon the occurrence of a 20,000 μs. pulse, it produces a pulse of current through the "bucket" capacitor 63 and through the diode 23 to add a charge to the storage capacitor 21. At the end of the pulse, the capacitor 63 discharges through the diode 24 to its original potential. By properly selecting the capacity value of the "bucket" capacitor 63, the added charge is made equal to the charge which is added to the capacitor 21 by a single 50 μs. pulse. Thus, the 20,000 μs. pulse causes the blocking oscillator 22 to fire one pulse earlier or 50 μs. sooner than it normally would whereby the desired repetition period of 19,950 μs. at the clipper 60 or 39,900 μs. at the output of the E-J oscillator 65 is obtained. It may be noted that, in the example given, each time a 20,000 μs. pulse occurs, the divider 16 divides by one instead of by two.

To obtain the 39,800 μs. repetition period, the switches 64 and 67 are moved to position No. 2. Now the 20,000 μs. pulses are applied through the "bucket" capacitor 71 to the divider 33 and upon the occurrence of a 20,000 μs. pulse it applies a charge to the capacitor 39 through the diode 48. At the end of the pulse the capacitor 71 discharges through the diode 47 to its original potential. The capacitor 71 is given a capacity value such that this charge applied by the 20,000 μs. pulse is equal to the charge applied by a single 100 μs. pulse. Thus, upon the occurrence of a 20,000 μs. pulse the blocking oscillator 41 fires one pulse early or 100 μs. sooner than it normally would whereby the desired repetition period of 19,900 μs. is obtained at the clipper 60 and a repetition period of 39,800 μs. is obtained at the output of the E-J oscillator 65. It may be noted that in the example given, the divider 33 divides by four instead of by five upon the occurrence of each 20,000 μs. pulse.

To obtain the 39,700 μs. repetition period, the switches 64 and 67 are moved to the No. 3 position, this being the switch position shown in the drawing. Now the 20,000 μs. pulses are applied to both the divider 16 and the divider 33 through the switches 64 and 67 whereby both dividers lose a count. Specifically, the blocking oscillators 22 and 41 of dividers 16 and 33 fire 50 μs. and 100 μs. early, respectively, or a total of 150 μs. early. Thus, the desired repetition period of 2×19,850 μs. or 39,700 μs. is obtained at the E-J oscillator output.

To obtain the 39,600 μs. repetition period, the switches 64 and 67 are moved to the No. 4 position. Again the 20,000 μs. pulses are applied to the divider 33 only, but this time through the capacitor 72 which has a capacity value such that a 20,000 μs. pulse causes the divider 33 to lose two counts, i. e., to trigger 200 μs. early. Thus, the desired period of 2×19,800 μs. or 39,600 μs. is obtained at the E-J oscillator.

At the No. 5 switch position, the divider 16 again triggers 50 μs. early and the divider 33 triggers 200 μs. early, or a total of 250 μs. for the two dividers. Thus, the repetition period is 19,750 μs. at the input to clipper 60 or 39,500 μs. at the output of the E-J oscillator 65.

At the No. 6 switch position, only the divider 33 receives the 20,000 μs. pulses. These pulses are applied through the capacitor 73 which is adjusted to make the divider 33 lose three counts. Thus, it triggers 300 μs. early to give a repetition period of 2×19,700 μs. or 39,400 μs. at the E-J oscillator output.

At the No. 7 switch position, both of the dividers 16 and 33 lose counts, divider 16 triggering 50 μs. early and divider 33 triggering 300 μs. early, or a total of 350 μs. early whereby the repetition period is 19,640 μs. at the clipper 60 or 39,300 μs. at the E-J oscillator output.

It may be preferred to employ a different group of repetition periods than the group of 40,000 μs., 39,900 μs., etc., assumed above. By making the final divider stage 59 divide by three, for example, instead of by four, the divider chain output pulses have a repetition period of 15,000 μs. so that a group of repetition periods of 30,000 μs., 29,900 μs., etc. may be employed. Or the divider stage 59 may be made to divide by five to obtain a group of repetition periods of 50,000 μs., 49,900 μs., etc.

In order to obtain a more rapid right "drift" of the A and B pulses in the preliminary steps of obtaining a time difference reading, it may be desirable to provide a capacitor 95 that may be connected by a switch 96 to the coupling capacitor 66 so that by closing the switch 96 additional counts will be lost by the divider 33. Thus, the A and B pulses may be drifted toward the right by closing the switch 96. When the switch 96 is opened the A and B pulses stop drifting and again are stationary.

*Cathode-ray trace and timing marker presentation*

Figures 3, 4:
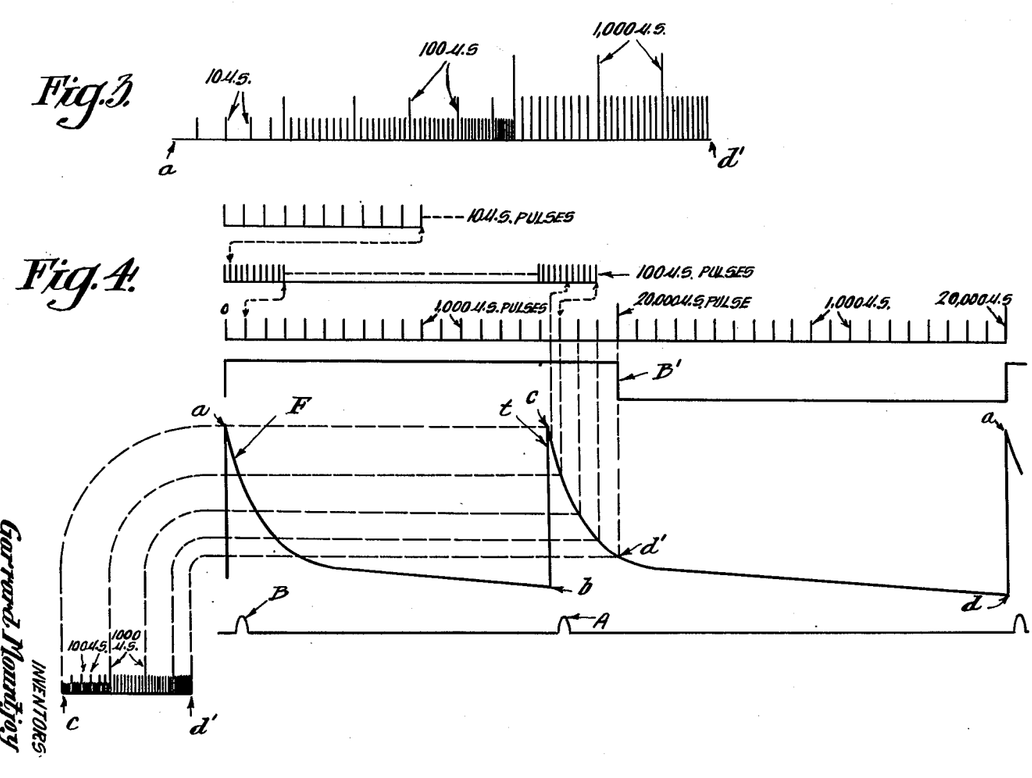
Figure 3 is a view of the adjustable cathode-ray trace appearing on the screen end of the cathode-ray indicator tube that is included in the apparatus of Fig. 1 and of the timing marker pulses thereon which are counted to determine the time interval between the received A and B pulses.
Figure 4 is a view showing the relation of the unblanked portion of the adjustable cathode-ray trace with respect to the horizontal deflecting waves and with respect to the timing marker pulses.

Before describing that portion of the receiving apparatus of Fig. 1 to which the timing marker and control pulses from the pulse generator unit are applied, reference will be made to Figs. 3, 4 and 5. Fig. 3 shows the appearance of the unblanked portion of the adjustable cathode ray trace on which the timing marks are counted to determine the time interval between the A and B pulses from a pair of ground stations. It will be noted that 1000 μs., 100 μs., and 10 μs. markers appear on the trace and that the left-hand portion of the trace has been expanded. The marks are counted from right to left, first the 1000 μs. marks, then the 100 μs. marks, then the 10 μs. marks, and finally the number of 1 μs. units are estimated. In the example shown the reading is 3547 μs.

Figure 5:
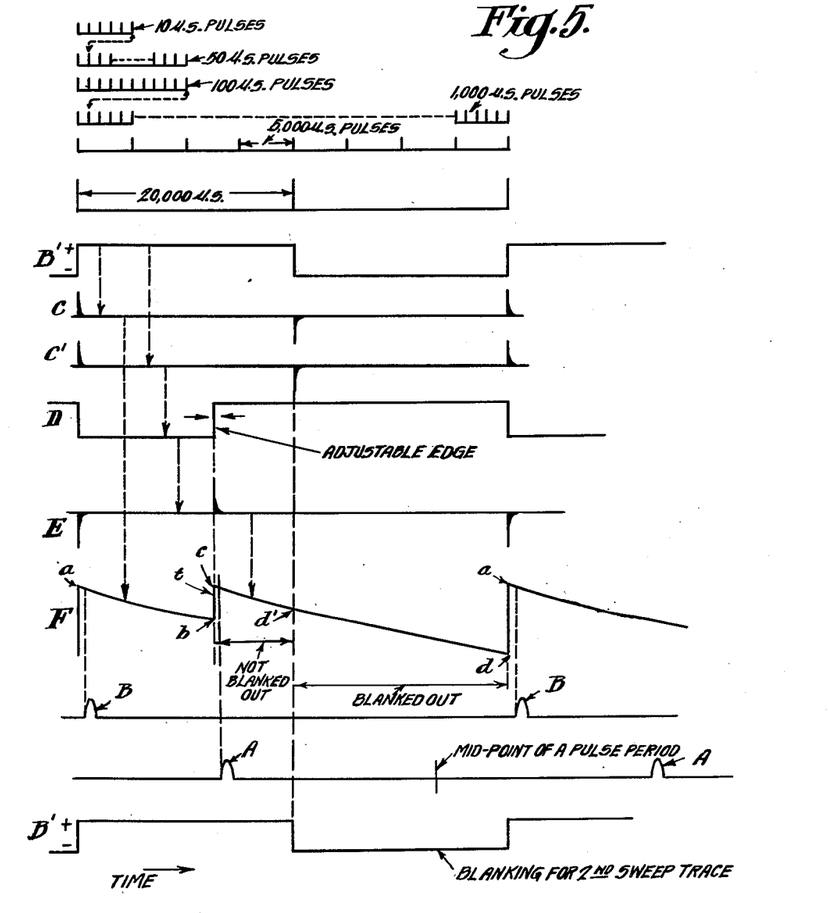
Figure 5 is a group of graphs which are referred to in explaining the operation of the system shown in Fig. 1.

As shown in Fig. 5, the B pulse is the one that occurs after the mid-point of the A pulse period, and it is the A pulse that is made to fall on the adjustable deflecting wave trace. By making the A pulse fall on the trace having the adjustable starting time, it is possible to provide an expanded trace with the expansion occurring where it is needed, i. e., where the 10 μs. markers are to be counted. This feature is claimed broadly in copending application Serial No. 560,648, filed October 27, 1944, in the name of George D. Hulst, Jr., entitled Radio navigation system now Patent 2,430,570 issued November 11, 1947 and describing a system wherein timing marks are counted on two traces, only one of which is expanded. In the present simplified system, all timing mark counting is done on only one trace.

In Figs. 4 and 5, the graphs F and B' show the wave shapes of the horizontal deflecting wave and of the blanking wave, respectively, for obtaining the desired cathode ray traces. The starting time $t$ of the second saw-tooth wave $c$—$d$ of the horizontal deflecting wave F may be adjusted by adjusting a multivibrator 101 by a knob 102' (Fig. 1) as will be explained hereinafter, thus adjusting the starting time of the second saw-tooth wave trace shown in Fig. 3. The right-hand portion of the second saw-tooth wave $c$—$d$ is blanked out from the mid-point of the deflecting wave cycle by the blanking wave B'.

Referring to Figs. 4 and 5, the received pulses B and A from the selected pair of stations are caused to appear on the first and second traces $a$—$b$ and $c$—$d$, respectively, at their expanded ends. This is accomplished by first making the pulses A and B stay stationary on the two sweeps by making a crystal oscillator frequency adjustment at the knob 11 in the event that there is a slight drift of these A and B pulses. The A and B pulses are now brought into the position of alignment or coincidence (i. e., one pulse above the other on the cathode ray tube screen) by the following procedure.

By adjustment of the crystal oscillator frequency at the knob 11 and/or by moving the station selection switch knob 65' to obtain a different pulse repetition rate, the pulse B is drifted onto the expanded end of the trace $ab$. Next, the pulse A is brought onto the expanded end of the adjustable trace $cd$ and is brought into coincidence with the pulse B. In order to bring the pulse A into coincidence with the pulse B, the starting time $t$ of the second sweep of the horizontal deflection wave F (Figs. 4 and 5) is adjusted by adjusting the multivibrator 101 at the knob 102', the circuit for accomplishing this being described hereinafter.

A comparison of the A and B pulses as shown in Fig. 5 with the horizontal deflecting wave F of the same figure will show that the condition of coincidence of the pulses A and B has been illustrated, both pulses falling on the expanded ends of successive traces and occurring at equal time intervals from the starts of the traces. It will be understood that while the pulses A and B and their corresponding traces appear alternately on the cathode ray tube screen, they appear to the eye to occur simultaneously because of persistence of vision, lag of phosphorescence of the screen or both.

Although the A and B pulses and the timing marks may be made to appear on the cathode ray traces simultaneously, it is usually preferred that the A and B pulses only appear on the sweep traces during the alignment step and that only the timing marks appear during the time reading step. The following description assumes that the latter is accomplished by means of suitable switching described hereinafter.

After the pulses A and B have been aligned, the operator moves a switch 126 (Fig. 1) from its alignment position to a time reading position. The timing marker pulses now appear on the unblanked portion $c$–$d'$ of the sweep trace $c$–$d$ as shown in Figs. 3 and 4, and by counting the 1000μs., the 100 μs., and the 10μs. timing marks, the desired time difference between the pulses A and B can be avoided.

From the foregoing discussion, it will be apparent that the amount that the starting time $t$ of the second sweep portion $c-d$ of graph F (Figs. 4 and 5) has to be shifted from the center or 20,000 $\mu$s. position in order to bring the pulse A into coincidence with the pulse B is a measure of the time difference between the pulses A and B or, in the example mentioned, it is a measure of the amount that an A pulse is away from the midpoint of the repetition period of the B pulses.

*General description of cathode-ray trace producing circuits*

The circuit for obtaining the operation described in connection with Figs. 3, 4 and 5 will first be described generally with reference to the block diagram of Fig. 1 and the graphs of Fig. 5.

Referring to Figs. 1 and 5, the Eccles-Jordan oscillator 65 is triggered by the 20,000 $\mu$s. pulses supplied over the conductor 61 to produce a rectangular voltage wave B' which is differentiated by differentiating circuits 106 and 107 to produce similar waves C and C', respectively. The positive pulse portions of the wave C' trigger the multivibrator 101 to produce the rectangular wave D. The timing of the back edge of the narrow pulse portion of the wave D is adjustable by means of the knob 102', this timing of the back edge controlling the starting time $t$ of the second sweep portion of the deflecting wave F as will soon be apparent. The multivibrator 101 may be any one of several well known types such as, for example, the one described in British Patent 456,840 to White and in the A. I. E. E. for June 1941, vol. 60, pp. 371–376.

The rectangular wave D from the multivibrator 101 is passed through a differentiating circuit 108 to produce the wave E which is supplied over a conductor 109 and through a mixer tube or circuit 110 to a deflecting wave producing circuit 111. The wave C' is also supplied over a conductor 112 and through the mixer 110 to the deflecting circuit 111 whereby the positive pulses of the wave C and of the wave E initiate the first and second sweeps, respectively, of the horizontal deflecting wave F. The deflecting wave F is applied from the circuit 111 through a push-pull amplifier 113 to the horizontal deflecting plates 114 of the cathode-ray indicator tube 116. The circuit 111 will be described in detail hereinafter with reference to Fig. 6.

Separation of the two cathode ray traces produced by the first sweep portion $a-b$ and the second sweep portion $c-d$, respectively, of the deflecting wave F is obtained by applying the wave D over a conductor 124 to the lower vertical deflecting plate 117. After aligning the pulses A and B, no use is made of the trace produced by the first sweep $a-b$ and it could be blanked out during the counting of the time markers although this is not done in the example illustrated.

To make a time measurement, the operator throws a switch 126 comprising switch arms 126a and 126b first to a pulse alignment position for aligning the pulses A and B received from a pair of ground transmitters, and then, after the pulse alignment, throws it to a time marker reading position (the switch position illustrated in Fig. 1), to count time marker pulses. In the "align" position of switch 126, a radio receiver 127 supplies the A and B pulses of a pair of ground stations over a conductor 128 to the upper vertical deflecting plate 117. The receiver 127 is tuned to the carrier wave frequency common to one whole group of transmitter ground stations of the navigation system, station selection being by means of the different pulse repetition rates for different pairs of stations as previously described.

In the time marker "read" position of switch 126, the time marker pulses of 10$\mu$s., 100$\mu$s., and 1000$\mu$s. repetition periods are supplied from the mixer tube 129 over a conductor 131 to the upper vertical deflecting plate 117, the A and B pulses no longer being applied to the cathode ray tube 116. The 20,000$\mu$s. pulses may also be included in this group of marker pulses, particularly if the feature of blanking out a portion of the adjustable trace is not employed. At the same time the wave B' is applied as a blanking pulse from the E-J oscillator 65 through a conductor 118, and through the switch arm 126a and a blocking capacitor 122 to the control grid 119 of the cathode ray tube 116. A suitable operating bias is supplied to the grid 119 through a grid resistor 120.

*Differential gain control circuit*

A differential gain control circuit for the receiver 127 preferably is provided as indicated in Fig. 1 for the purpose of keeping the amplitudes of the A and B pulses substantially alike at the receiver output, thus facilitating the A and B pulse alignment. The gain control circuit includes a potentiometer resistor 171. The wave D is applied to the opposite ends of the resistor 171 with opposite polarities, a wave D of reversed polarity being obtained by means of a polarity reversing tube 123. An adjustable tap 172 may be moved to either side of the center of resistor 171 to decrease the gain of the receiver 127 during either the reception of the pulse A or the pulse B. As this circuit forms no part of the present invention no detailed description will be given. It may be noted that the differential gain control circuit may be the same as that described in application Serial No. 560,648, filed October 27, 1944 by George D. Hulst, Jr. and entitled Radio navigation system.

*Detailed description of deflecting circuit (Figure 6)*

Figures 6, 7:
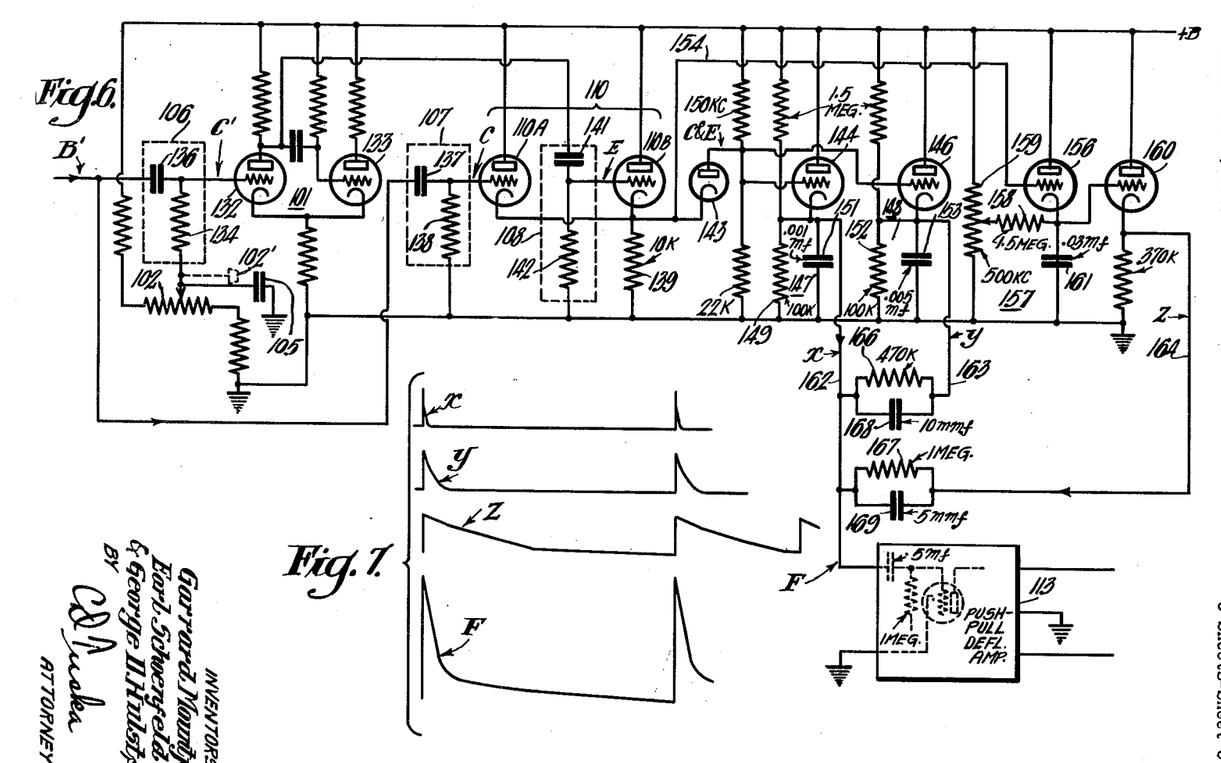
Figure 6 is a circuit diagram of the wave shaping and cathode-ray deflection and control circuits included in the system of Fig. 1.
Figure 7 is a group of graphs that are referred to in explaining the operation of the circuit shown in Fig. 6.

Referring to Fig. 6, the multivibrator 101, in the example illustrated, comprises two triodes 132 and 133 which are connected to form a cathode-coupled multivibrator. The pulses C' from the differentiating circuit 106 are applied to the grid of the triode 132, this grid having an adjustable positive bias applied thereto from a potentiometer resistor 102 through a grid resistor 134. This bias is adjusted by means of the control knob 102' operating an adjustable tap on resistor 102 for adjusting the time of occurrence of the back edge of the narrow multivibrator pulse of the wave E. Preferably a bypass capacitor 105 is connected from the adjustable tap to ground. The differentiating circuit 106 comprises a small coupling capacitor 136 and the grid resistor 134.

The differentiating circuit 107 applies the pulses C to the grid of a triode 110A that forms part of the mixing circuit 110. The differentiating circuit 107 comprises a small coupling capacitor 137 and a grid resistor 138. The differentiating circuit 108 applies the pulses E to the grid of a triode 110B forming the other part of the mixer 110, the tube 110A and 110B having a common cathode resistor 139 across which the mixed signals C and E appear. The differentiating circuit 108 comprises a small coupling capacitor 141 and a grid resistor 142.

The mixed signals C and E preferably are applied through a clipper diode 143 to keep the amplitude of the positive pulses a constant value. The clipped pulses are applied to the grids of a pair of triodes 144 and 146.

The triodes 144 and 146 have wave-shaping cathode circuits 147 and 148, respectively. The circuit 147 comprises a cathode resistor 149 and a capacitor 151 in parallel therewith. The circuit 148 comprises a cathode resistor 152 and a capacitor 153 in parallel therewith.

Upon the occurrence of either a pulse C or a pulse E, the tubes 144 and 146, which are normally biased to cutoff, conduct anode current to charge the capacitors 151 and 153, respectively. This charging of 151 and 153 is practically instantaneous. At the termination of the pulse C or E, the capacitors 151 and 153 discharge at a rate that is slow compared with the charging rate and at a rate that is determined by the time constants of the circuits 147 and 148, these time constants differing from each other. Thus, as illustrated in Fig. 7, across the circuits 147 and 148 there are produced the voltage waves $x$ and $y$, respectively, which are to be combined with a third voltage wave $z$ to produce the desired logarithmic deflecting wave F.

The wave $z$ is obtained by applying the pulses C and E from the cathode resistor 139 over a conductor 154 to the grid of a tube 156 which includes a wave shaping network 157 in its cathode circuit. The network 157 comprises a high impedance resistor 158, the lower portion of a biasing resistor 159, and a capacitor 161. As in the wave-shaping circuits for producing the waves $x$ and $y$, the capacitor 161 is charged rapidly upon application of a pulse to the tube 156. To produce wave $z$, however, the discharge of capacitor 161 is made slow enough by proper adjustment of the time constant of network 157 so that it (unlike capacitors 151 and 153) has not discharged completely by the time the next pulse C or E occurs. The wave $z$ is applied to a cathode follower tube 160.

It will be seen that the effect of adding the waves $x$ and $y$ to the wave $z$ is to greatly increase the slope of the deflecting wave F at its start whereby the scale for the corresponding portion of the cathode-ray trace is expanded. The waves $x$, $y$ and $z$ are added by supplying them through leads 162, 163 and 164 to the input circuit of the deflecting-wave amplifier 113. The leads 163 and 164 preferably include high impedance resistors 166 and 167 shunted by capacitors 168 and 169, respectively, for obtaining undistorted addition of the several waves. It will be apparent that the deflecting wave F may be shaped as desired for different scale expansions by changing the time constants of one or more of the circuits 147, 148 and 157.

In Fig. 6, circuit values have been indicated in ohms, thousands of ohms, megohms, microfarads and micromicrofarads merely by way of example.

It should be understood that the invention is not limited to the use of the specific logarithmic deflecting wave circuit described above and, in fact, is not limited to the use of a deflecting wave that is logarithmic in wave form since other waves such as an exponential shaped deflecting wave may be used for obtaining an expanded trace. In one aspect, the invention is not limited to the use of an expanded trace since, for example, the blanking feature may be employed where the deflecting wave is a linear sawtooth wave. As previously indicated, the invention may be practiced without the blanking feature by including the 20,000 μs. pulses in the group of marker pulses supplied to the marker mixer 129. Then a 20,000 μs. timing mark will appear on the adjustable trace $c$–$d$, this mark being easily identified since it is the mark of the largest amplitude, and the timing marks to the left of the 20,000 μs. mark are counted as previously described. The scope of the invention is set forth in the appended claims.

We claim as our invention:

1. In a navigation system wherein periodically recurring radio pulses are transmitted from A and B ground stations to radiate A and B pulses with the B pulses occurring at a predetermined time following the mid-point of the period of the A pulses, receiving apparatus for measuring the time interval between the A and B pulses at a point remote from said ground stations which comprises means for receiving said A and B pulses at said point, means for producing successively pairs of sequentially occurring deflecting waves having decreasing slope from the start of the wave and which are identical throughout their useful deflecting portions, each pair of waves having a total repetition period equal to that of said A and B pulses, the second wave of a pair starting before the mid-point of said period and ending after said mid-point, means for producing timing pulses having a fixed time relation to the start and finish of said repetition period, means for causing each of said deflecting waves to produce a cathode-ray trace and means for causing said A and B pulses to appear on said two cathode-ray traces, respectively, with the A pulse on the trace that is produced by the second wave of the pair of waves, means for changing the starting time of said second deflecting wave with respect to said mid-point until said A and B pulses on said traces are in alignment or coincidence, and means for causing said timing pulses to appear as timing marks on the trace produced by said second wave.

2. In a navigation system wherein periodically recurring radio pulses are transmitted from A and B ground stations to radiate A and B pulses with the B pulses occurring at a predetermined time following the mid-point of the period of the A pulses, the method of measuring the time interval between the A and B pulses at a point remote from said ground stations which comprises receiving said A and B pulses at said point, producing successively pairs of sequentially occurring deflecting waves having decreasing slope from the start of the wave for expanding their cathode-ray traces, said waves being identical throughout their useful deflecting portions, each pair of waves having a total repetition period equal to that of said A and B pulses, the second wave of a pair starting before the mid-point of said period and ending after said mid-point, producing timing pulses having a fixed time relation to the start and finish of said repetition period, causing each of said deflecting waves to produce a cathode-ray trace and causing said A and B pulses to appear on said two cathode-ray traces, respectively, with the A pulse on the trace that is produced by the second wave of the pair of waves, changing the starting time of said second deflecting wave with respect to said mid-point until said A and B pulses on said traces are in alignment or coincidence, and causing said timing pulses to appear as timing marks on the trace produced by said second wave.

3. In a navigation system wherein periodically recurring radio pulses are transmitted from A and B ground stations to radiate A and B pulses with the B pulses occurring at a predetermined time following the mid-point of the period of the A pulses, receiving apparatus for measuring the time interval between the A and B pulses at a point remote from said ground stations which comprises means for receiving said A and B pulses at said point, means for producing successively pairs of sequentially occurring deflecting waves which are substantially logarithmic in wave form and which are identical throughout their useful deflecting portions, each pair of waves having a total repetition period equal to that of said A and B pulses, the second wave of a pair starting before the mid-point of said period and ending after said mid-point, means for producing groups of timing pulses having a fixed time relation to the start and finish of said repetition period and having a decimal relation to each other, means for causing each of said deflecting waves to produce a cathode-ray trace and means for causing said A and B pulses to appear on said two cathode-ray traces, respectively, with the A pulse on the trace that is produced by the second wave of the pair of waves, means for changing the starting time of said second deflecting wave with respect to said mid-point until said A and B pulses on said traces are in alignment or coincidence, and means for causing said timing pulses to appear as timing marks on the trace produced by said second wave.

4. In a navigation system wherein periodically recurring radio pulses are transmitted from A and B ground stations to radiate A and B pulses with the B pulses occurring at a predetermined time following the mid-point of the period of the A pulses, the method of measuring the time interval between the A and B pulses at a point remote from said ground stations which comprises receiving said A and B pulses at said point, producing successively pairs of sequentially occurring deflecting waves, each of said pairs of waves defining a deflecting wave cycle, deflecting a cathode ray by said waves to produce two cathode-ray traces, causing said A and B pulses to appear on said two traces with the A pulse on the trace that is produced by the second of said pair of deflecting waves, adjusting the starting time of the second of said pair of deflecting waves until it is such that said A and B pulses are aligned, producing timing marks on the trace produced by said second deflecting wave, and blanking out the portion of said last trace from the mid-point of said deflecting wave cycle to the end of said cycle.

5. In a navigation system wherein periodically recurring radio pulses are transmitted from A and B ground stations to radiate A and B pulses with the B pulses occurring at a predetermined time following the mid-point of the period of the A pulses, the method of measuring the time interval between the A and B pulses at a point remote from said ground stations which comprises receiving said A and B pulses at said point, producing successively pairs of sequentially occurring deflecting waves having decreasing slope from at least near the start of the wave which are identical throughout their useful deflecting portions, each of said pair of waves defining a deflecting wave cycle, deflecting a cathode ray by said waves to produce two parallel adjacent cathode-ray traces, causing said A and B pulses to appear on said two traces with the A pulse on the trace that is produced by the second of said pair of deflecting waves, adjusting the starting time of the second of said pair of deflecting waves until it is such that said A and B pulses are aligned, producing timing marks on the trace produced by said second deflecting wave, and blanking out the portion of said last trace from the mid-point of said deflecting wave cycle to the end of said cycle.

6. In a navigation system wherein periodically recurring radio pulses are transmitted from A and B ground stations to radiate A and B pulses with the B pulses occurring at a predetermined time following the mid-point of the period of the A pulses, means for measuring the time interval between the A and B pulses at a point remote from said ground stations which comprises means for receiving said A and B pulses at said point, means for producing successively pairs of sequentially occurring deflecting waves, each of said pairs of waves defining a deflecting wave cycle, means for deflecting a cathode-ray by said waves to produce two cathode-ray traces, means for causing said A and B pulses to appear on said two traces with the A pulse on the trace that is produced by the second of said pair of deflecting waves, means for adjusting the starting time of the second of said pair of deflecting waves until it is such that said A and B pulses are aligned, means for producing timing marks on the trace produced by said second deflecting wave, and means for blanking out the portion of said last trace from the mid-point of said deflecting wave cycle to the end of said cycle.

7. The method of measuring the time relation of one group of periodically recurring received pulses with respect to another group of periodically recurring received pulses where both groups of pulses have the same repetition period, said method comprising the steps of producing two successive cathode-ray deflecting waves each starting from the same voltage level and each of identical slope over the useful deflecting portion, the second of said waves having an adjustable starting time, said pair of waves having a total repetition period equal to that of said groups of received pulses, producing timing pulses having a fixed time relation to the start and finish of the cycle of said two deflecting waves, causing each of said deflecting waves to produce a cathode-ray trace and causing a pulse of each group of received pulses to appear on said two cathode-ray traces, respectively, changing the start of the second deflecting wave of said cycle with respect to the mid-point of the full deflecting wave cycle until said pulses on said traces are in alignment or coincidence, causing said timing pulses to appear as timing marks on said traces, and blanking out said second deflecting wave from said mid-point to the end of said cycle whereby the timing marks on the remaining trace produced by said second deflecting wave indicate the amount of time that the start of said second deflecting wave is shifted with respect to said mid-point of the full deflecting wave cycle.

8. In a system for measuring the time relation of one group of periodically recurring received pulses with respect to another group of periodically recurring received pulses where both groups of pulses have the same repetition period, said system comprising means for producing two successive cathode-ray deflecting waves each starting from the same voltage level and each of identical slope over the useful deflecting portion, the second of said waves having an adjustable starting time, said pair of waves having a total repetition period equal to that of said groups of received pulses, means for producing timing pulses having a fixed time relation to the start and finish of the cycle of said two deflecting waves, means for causing each of said deflecting waves to produce a cathode-ray trace and means for causing a pulse of each group of received pulses to appear on said two cathode-ray traces, respectively, means for changing the start of the second deflecting wave of said cycle with respect to the mid-point of the full deflecting wave cycle until said pulses on said traces are in alignment or coincidence, means for causing said timing pulses to appear as timing marks on said traces, and means for blanking out said second deflecting wave from said mid-point to the end of said cycle whereby the timing marks on the remaining trace produced by said second deflecting wave indicate the amount of time that the start of said second deflecting wave is shifted with respect to said mid-point of the full deflecting wave cycle.

9. In a navigation system wherein periodically recurring radio pulses are transmitted from A and B ground stations to radiate A and B pulses with the B pulses occurring at a predetermined time following the mid-point of the period of the A pulses, receiving apparatus for measuring the time interval between the A and B pulses at a point remote from said ground stations comprising means for receiving said A and B pulses at said point, means for producing successively pairs of sequentially occurring deflecting waves which are identical throughout their useful deflecting portions, each pair of waves having a total repetition period equal to that of said A and B pulses, means for producing timing pulses having a fixed time relation to the start and finish of the cycle of said two deflecting waves, means for causing each of said deflecting waves to produce a cathode-ray trace and means for causing said A and B pulses to appear on said two cathode-ray traces, respectively, with the A pulse on the trace that is produced by the second wave of the pair of waves, means for changing the starting time of said second deflecting wave with respect to the mid-point of the full deflecting wave cycle until said A and B pulses on said traces are in alignment or coincidence, means for causing said timing pulses to appear as timing marks on said traces, and means for blanking out said second deflecting wave trace from said mid-point to the end of said cycle whereby the timing marks on the remaining portion of the second deflecting wave trace indicate the amount of time that the start of said second deflecting wave is shifted with respect to said mid-point of the full deflecting wave cycle.

10. In a navigation system wherein periodically recurring radio pulses are transmitted from A and B ground stations to radiate A and B pulses with the B pulses occurring at a predetermined time following the mid-point of the period of the A pulses, receiving apparatus for measuring the time interval between the A and B pulses at a point remote from said ground stations which comprises means for receiving said A and B pulses at said point, means for producing successively pairs of sequentially occurring deflecting waves having decreasing slope from the start of the wave and which are identical throughout their useful deflecting portions, each pair of waves having a total repetition period equal to that of said A and B pulses, the second wave of a pair starting before the mid-point of said period and ending after said mid-point, means for causing each of said deflecting waves to produce a cathode-ray trace and means for causing said A and B pulses to appear on said two cathode-ray traces, respectively, with the A pulse on the trace that is produced by the second wave of the pair of waves, and means for changing the starting time of said second deflecting wave with respect to said mid-point until said A and B pulses on said traces are in alignment or coincidence.

11. In a navigation system wherein periodically recurring radio pulses are transmitted from A and B ground stations to radiate A and B pulses with the B pulses occurring at a predetermined time following the mid-point of the period of the A pulses, the method of measuring the time interval between the A and B pulses at a point remote from said ground stations which comprises receiving said A and B pulses at said point, producing successively pairs of sequentially occurring deflecting waves having decreasing slope from the start of the wave for expanding their cathode-ray traces, said waves being identical throughout their useful deflecting portions, each pair of waves having a total repetition period equal to that of said A and B pulses, the second wave of a pair starting before the mid-point of said period and ending after said mid-point, causing each of said deflecting waves to produce a cathode-ray trace and causing said A and B pulses to appear on said two cathode-ray traces, respectively, with the A pulse on the trace that is produced by the second wave of the pair of waves, and changing the starting time of said second deflecting wave with respect to said mid-point until said A and B pulses on said traces are in alignment or coincidence.

No references cited.